(12) United States Patent
Kou (10) Patent No.: US 6,661,466 B1
(45) Date of Patent: Dec. 9, 2003

(54) SYSTEM AND METHOD FOR SETTING DEFAULT AUDIO AND SUBTITLING LANGUAGE PREFERENCES FOR A VIDEO TUNER

(75) Inventor: Sho Kou, Saratoga, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 305 days.

(21) Appl. No.: 09/665,223

(22) Filed: Sep. 18, 2000

(51) Int. Cl.[7] .................................................. H04N 5/44
(52) U.S. Cl. ......................... 348/553; 348/465; 348/738
(58) Field of Search ................................. 348/569, 465, 348/553, 564, 563, 714, 731, 738, 468

(56) References Cited

U.S. PATENT DOCUMENTS

| | | | | |
|---|---|---|---|---|
| 5,442,452 A | * | 8/1995 | Ryu ........................... | 358/335 |
| 5,570,134 A | * | 10/1996 | Hong .......................... | 348/467 |
| 6,204,885 B1 | * | 3/2001 | Kwoh ......................... | 348/564 |

OTHER PUBLICATIONS

"AV/C Tuner Model and Command Set"; Version 1.0; Apr. 15, 1998; Audio/Video Working Group of the 1394 Trade Association; Austin, Texas.

* cited by examiner

Primary Examiner—Victor R. Kostak
(74) Attorney, Agent, or Firm—Wagner, Murabito & Hao LLP (57) ABSTRACT

The present invention enables automatic setting a natural language default selection in a video presentation device and facilitates easy manufacturing adjustments to accommodate a variety of possible natural language preferences that exist among different geographical areas. A video tuner natural language default selection system of the present invention facilitates reception of video communication signals (e.g., a television broadcast signal) and tuning into particular geographical default natural language information included in the video communication signal. A tuner controller provides instructions to a tuner on the selection of the geographical default natural language information for communication to downstream components. A memory stores information for the tuner controller, including a geographical default natural language indicator for referring to a geographical natural language table comprising natural language selections. In one exemplary implementation the geographical natural language table is configured to comply with IEEE 1394 requirements and is included in an IEEE 1394 compliant AV/C tuner preferred components list descriptor.

18 Claims, 6 Drawing Sheets

| PREFERRED COMPONENTS LIST DESCRIPTOR | |
|---|---|
| ADDRESS | CONTENTS |
| $0000_{16}$ | DESCRIPTOR_LENGTH |
| $0001_{16}$ | |
| $0002_{16}$ | LIST_TYPE = $90_{16}$ |
| $0003_{16}$ | ATTRIBUTES = xx01 xxxx |
| $0004_{16}$ | SIZE_OF_LIST_SPECIFIC_INFORMATION |
| $0005_{16}$ | |
| $0006_{16}$ | NUMBER_OF_ENTRIES (n) |
| $0007_{16}$ | |
| $0008_{16}$ : : : | OBJECT_ENTRY [0] |
| : | : |
| : : : | OBJECT_ENTRY [n-1] |

| PREFERRED COMPONENTS OBJECT ENTRY DESCRIPTOR | |
|---|---|
| ADDRESS OFFSET | CONTENTS |
| $00_{16}$ | DESCRIPTOR_LENTGH |
| $01_{16}$ | |
| $02_{16}$ | ENTRY_TYPE = $90_{16}$ |
| $03_{16}$ | ATTRIBUTES = xx0x xxxx |
| : : : : | OBJECT_ID |
| : : | SIZE_OF_ENTRY_SPECIFIC_INFORMATION |
| : : : | ENTRY_SPECIFIC_INFORMATION (PREFERRED COMPONENTS DESCRITOR) |

| ADDRESS OFFSET | CONTENTS |
|---|---|
| \multicolumn{2}{l}{PREFERRED COMPONENTS OBJECT ENTRY SPECIFIC INFORMATION} |
| $00_{16}$ | PREFERRED_COMPONENTS_NAME_LENGTH |
| $01_{16}$ ⋮ ⋮ | PREFERRED_COMPONENTS_NAME |
| ⋮ | NUMBER_OF_AUDIO_LANGUAGE_PREFERENCES (n) |
| ⋮ ⋮ ⋮ | AUDIO_LANGUAGE_PREFERENCE [0] |
| ⋮ | ⋮ |
| ⋮ ⋮ ⋮ | AUDIO_LANGUAGE_PREFERENCE [n-1] |
| ⋮ | NUMBER_OF_SUBTITLING_LANGUAGE_PREFERENCES (m) |
| ⋮ ⋮ ⋮ | SUBTITLING_LANGUAGE_PREFERENCE [0] |
| ⋮ | ⋮ |
| ⋮ ⋮ ⋮ | SUBTITLING_LANGUAGE_PREFERENCE [m-1] |

```
┌─────────────────────────────────────────────────────────────┐
│  STORING A LIST OF GEOGRAPHIC NATURAL LANGUAGE PREFERENCES. │
│                            410                              │
└─────────────────────────────────────────────────────────────┘
                              │
                              ▼
┌─────────────────────────────────────────────────────────────┐
│       STORING A DEFAULT NATURAL LANGUAGE INDICATION         │
│                 IF PROVIDED AND STORED.                     │
│                            420                              │
└─────────────────────────────────────────────────────────────┘
                              │
                              ▼
┌─────────────────────────────────────────────────────────────┐
│ A SIGNAL IS SELECTIVELY TUNED BASED UPON THE DEFAULT NATURAL│
│  LANGUAGE INDICATION OF A GEOGRAPHICAL NATURAL LANGUAGE     │
│                       PREFERENCE.                           │
│                            430                              │
└─────────────────────────────────────────────────────────────┘
```

FIGURE 4

SYSTEM AND METHOD FOR SETTING DEFAULT AUDIO AND SUBTITLING LANGUAGE PREFERENCES FOR A VIDEO TUNER

FIELD OF THE INVENTION

The present invention relates to the field of video presentation systems and methods. More particularly, the present invention relates to a system and method for setting the natural language preferences of audio/visual command tuners in an Institute of Electrical and Electronic Engineers (IEEE) 1394 standards compliant system.

BACKGROUND OF THE INVENTION

Electronic systems and circuits have made a significant contribution towards the advancement of modem society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to produce these results often include digital video technologies that provide images and audio presentations. Usually, videos are presented in natural languages spoken in a geographic area and electronic video devices are typically configured to present information in a preferred natural language. There are numerous geographic areas associated with natural language preferences and significant manufacturing resources are consumed configuring the natural language preferences of video presentation devices for different geographical regions.

Video information is often communicated in a broadcast format to numerous viewers. Video broadcast presentations (e.g., a television broadcast) are usually a very efficient way to present significant amounts of information to a large audience. For example, videos capture events and occurrences that are presented to people that were not present when the video was taken. Watching and listening to a video of an event or occurrence provides a virtual first hand experience permitting viewers to form their own impressions about the event or occurrence.

Video broadcast presentations often involve numerous electronic devices arranged in a variety of configurations. For example, a digital video camera captures video information associated with images and sounds, a processor processes the video information, a storage medium stores the video information, a display device displays images and speakers provide sounds. The devices are usually required to communicate with each other in order to execute a video presentation. Broadcast video information is often communicated from a transmitter for transmitting the information to a receiver for receiving the information. Receivers typically include a tuner for tuning in to a particular information in a broadcast. Communications between the electronic devices usually have to conform to a communication protocol in order for the devices to understand the communicated information.

An organization that specifies standards for the electronics industry is the Institute of Electrical and Electronics Engineers (IEEE). One standard the IEEE has promulgated is the IEEE 1394 communication protocol standard, which primarily specifies conventions for high speed serial system communications. Communications transmitted in accordance with the IEEE 1394 communication protocol standard are often communicated between computer systems, audio and video products, printers, scanner products, hard disks (especially raid arrays) and digital video camera recorders. In particular, the IEEE 1394 communication protocol standard is often utilized in the transmission of information associated with digital video technology.

The ability to accurately perceive transmitted broadcast video information is often dependent upon presenting the information in a natural language an audience understands. Usually, video presentation devices that provide audio and textual subtitling, such as a television (TV) or a set top box (STB), are configured to handle a particular geographic regional natural language preference. For example, a video presentation device in the United States typically presents information in English, a video presentation device in Japan typically presents information in Japanese, and a video presentation device in France typically presents information in French. Language preferences for a geographic region are typically set at a factory when a video device is manufactured.

Significant manufacturing resources are often consumed configuring geographic natural language preferences in electronic devices such as video tuners. Traditionally, each natural language preference is programmed individually and only one set of natural language preferences corresponding to a single geographic region is provided. Usually, the manufacturer has to stop production to determined which geographic region a particular video tuner (e.g., in a television) is going to be marketed in, determine which natural languages to include in the geographic natural language preferences and then individually enter each geographic natural language preference in the correct priority order. Making manufacturing adjustments to accommodate the variety of possible natural language preferences that exist among different geographical areas requires significant expenditure of manufacturing resources. Once a video device is manufactured, its ability to properly function is often limited to the geographic area corresponding to the predetermined single set of natural language preferences, it is relatively difficult to change the selection of geographical natural language preferences if a television is marketed in a different geographical area.

SUMMARY

Accordingly, what is required is a system and method that facilitates efficient geographic natural language preference selection. The system and method should assist reduction of resources expended on setting geographical natural language preferences during manufacturing processes. The present invention facilitates efficient geographic natural language preference selection and assists the reduction of resources expended on the setting geographical natural language preferences during manufacturing processes. The present invention natural language default selection system and method facilitates easy manufacturing adjustments to accommodate a variety of possible natural language preferences that exist among different geographical areas and provides the ability to conveniently change the selection of geographical natural language preferences if a video presentation system is marketed in a different geographical area.

The present invention enables automatic setting a natural language default selection in a video presentation device and facilitates easy manufacturing adjustments to accommodate a variety of possible natural language preferences that exist among different geographical areas. A video tuner natural language default selection system of the present invention facilitates reception of video communication signals (e.g., a television broadcast signal ) and tuning into particular geographical default natural language information included in the video communication signal. A tuner controller provides instructions to a tuner on the selection of the geographical default natural language information for communication to downstream components. A memory stores information for the tuner controller, including a geographical default natural language indicator for referring to a geographical natural language table comprising natural language selections. In one exemplary implementation the geographical natural language table is configured to comply with IEEE 1394 requirements and is included in an IEEE 1394 compliant AV/C tuner preferred components list descriptor.

DETAILED DESCRIPTION

Reference will now be made in detail to the preferred embodiments of the invention, a system and method for setting default audio and subtitling language preferences for a video tuner, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention provides an efficient video tuner natural language default selection system and method. The video tuner natural language default selection system of the present invention facilitates accurate and reliable implementation of geographical natural language preference settings during the manufacturing process. The present invention permits selection from a variety of geographical natural language preferences with a simple manipulation of a single natural language indicator.

Figure 1A:
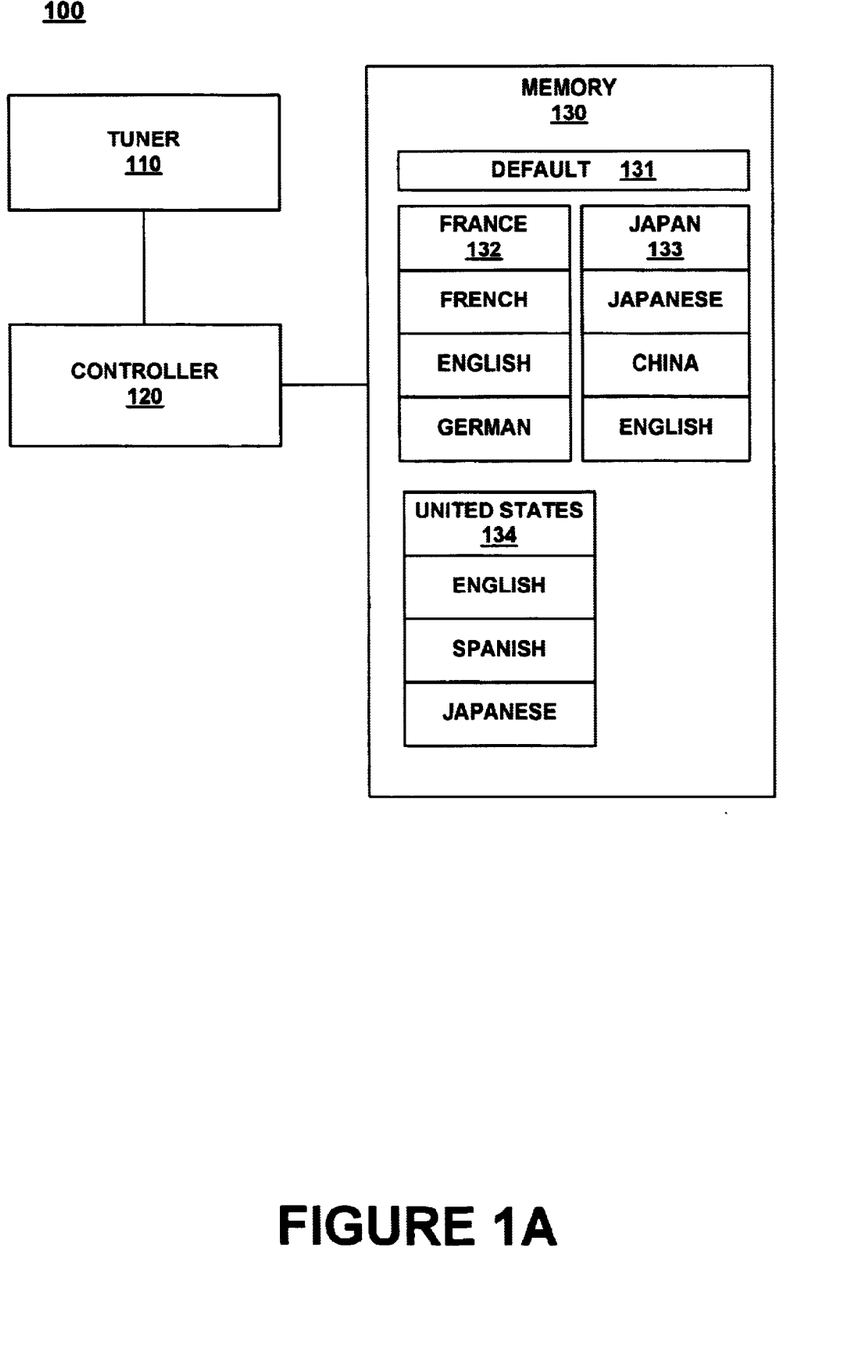
FIG. 1A is a block diagram of one embodiment of a video tuner natural language default selection system of the present invention.

FIG. 1A is a block diagram of video tuner natural language default selection system 100, one embodiment of the present invention. Video tuner natural language default selection system 100 comprises video tuner 110, tuner controller 120, and memory 130. Video tuner 110 is coupled to tuner controller 120 which is coupled to memory 130. The components of video tuner natural language default selection system 100 cooperatively operate to facilitate presentation of information in desired natural languages associate with a geographical location. Video tuner 110 receives video communication signals (e.g., television broadcast signals) and tunes into particular information included in the communication signals. Tuner controller 120 provides instructions to video tuner 110 on the selection of information for communication to downstream components. In one embodiment of the present invention tuner controller 120 is a processor. Memory 130 stores information for tuner controller 120.

In one embodiment of the present invention, memory 130 includes a geographical default natural language indicator 131. Geographical default natural language indicator 131 refers to a geographical natural language table comprising natural language selections. The default natural language indicator acts as a pointer to a geographical natural language table. The geographical natural language table comprises a listing of the most likely natural language preferences of video device users located in a particular geographical area. For example, a user of a video device (e.g., television, set top box, etc.) marketed and utilized in France would most likely have a first preference for information to be communicated in the French natural language. A second preference would most likely be English and a third preference German. A user of a video device marketed and utilized in Japan would most likely have a first preference for information to be communicated in the Japanese natural language. A second preference would most likely be Chinese and a third preference English.

In one exemplary implementation of the present invention, memory 130 includes three geographical natural language tables, one for France (geographical natural language table 132), one for Japan (geographical natural language table 133), and one for the United States (geographical natural language table 134). The geographical natural language table for France comprises a first natural language selection of French, a second natural language selection of English and a third natural language selection of German. The geographical natural language table for Japan includes a first natural language selection of Japanese, a second natural language selection of Chinese and a third natural language selections of English. The geographical natural language table for the United States includes a first natural language selection of English, a second natural language selection of Spanish and a third natural language selection of Japanese.

In one embodiment of the present invention, a geographical natural language table for each geographical region in which a video device model is marketed is automatically stored in a memory (e.g., memory 130) during the manufacturing process. This permits the manufacturer to achieve greater automation and standardization of manufacturing operations since video devices of the same model include the same listing of geographic natural language preferences.

After geographical natural language tables are automatically stored in a memory of the television, it is relatively simple to enter an appropriate geographical natural language table identifier in a default natural language indicator (e.g., default natural language indicator 131) when the area the television is going to be marketed to is determined. Thus, an easy modification to a single default natural language indicator provides a complete listing of natural language preferences associated with a geographic location. In addition, it is also relatively easy change the selection of geographical natural language preferences by making a signal change to the default natural language indicator if a television is marketed in a different geographical area. The manufacturer does not have to stop production to determined which geographic region a particular television is going to be marketed in, determine which natural languages to include in the geographic natural language preferences and then enter each geographic natural language preference individually in the correct order.

The default natural language indicator is automatically set at the factory during the manufacturing process. Thus, a user does not have to set natural language preferences for a geographical location. In one embodiment of the present invention, a natural language default selection system permits a user to override a default natural language indicator and select another geographical natural language table or customize a selection of natural language preferences.

Figure 1B:
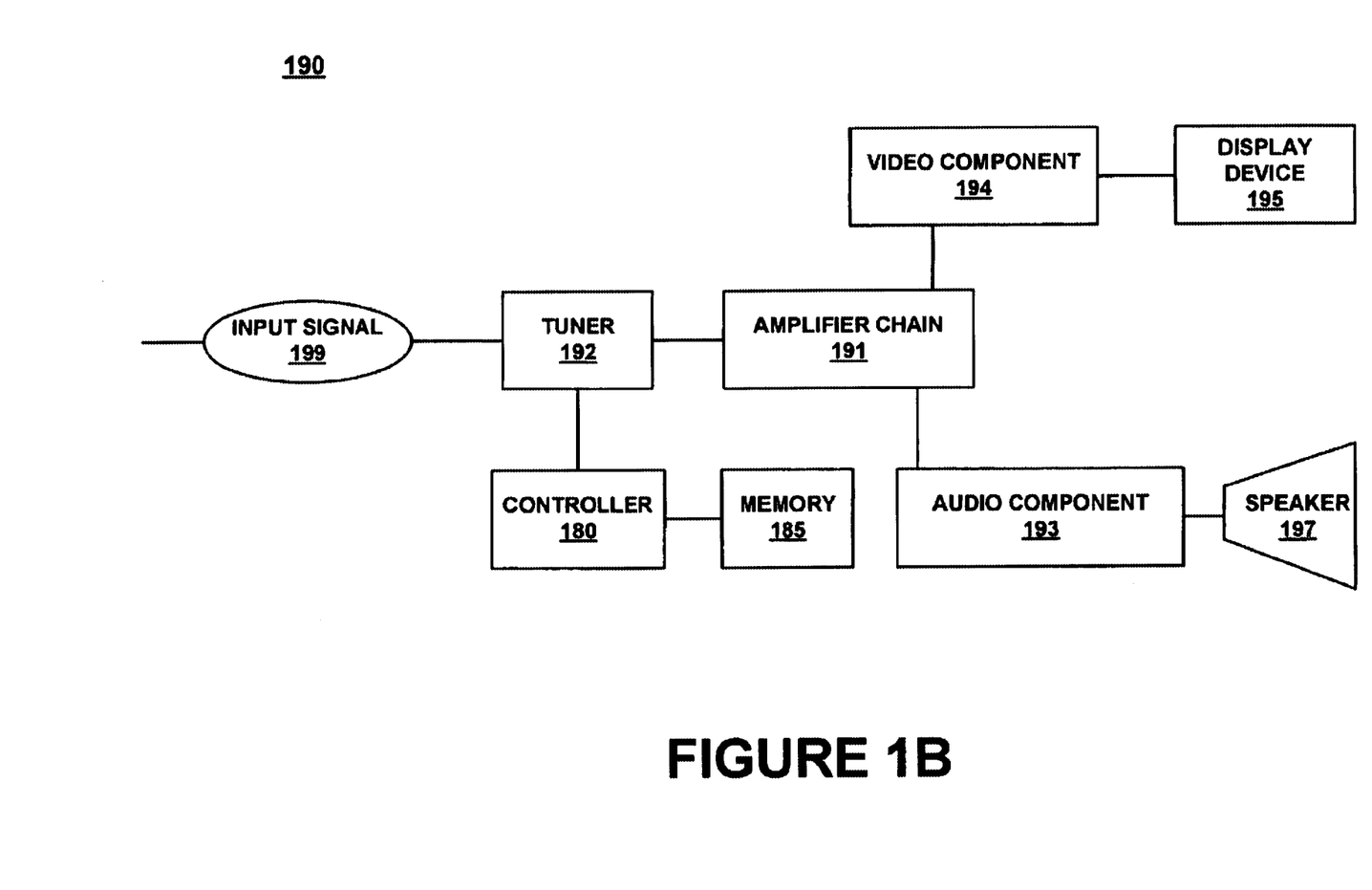
FIG. 1B is a block diagram of a television system comprising one embodiment of the present invention.

FIG. 1B is a block diagram of television system 190, one embodiment of the present invention. Television system 190 comprises tuner 192, tuner controller 180, memory 185, amplifier chain 191, video component 194, audio component 193, display device 195, and speaker 197. Tuner 192 is coupled to tuner controller 180 and amplifier chain which is coupled to video component 194 and audio component 193. Video component 194 is coupled to display device 195 and audio component 193 is coupled to speaker 197.

The components of television system 190 cooperatively operate to provide a television presentation. Tuner 192 receives input signal 199 and selectively tunes into particular information communicated via signal 199, demultiplexes the information and communicates the information to amplifier chain 191. Amplifier chain 191 amplifies the signals and forwards video information to video component 194 for video signal processing and audio information to audio component 193 for audio signal processing. Tuner controller 180 is similar to tuner controller 120 and provides instructions to tuner 192 on the selection of information for communication to amplifier chain 191. Memory 185 is similar to memory 130 and stores information for tuner controller 180, including a geographical default natural language indicator and a geographical natural language table comprising natural language selections.

Figure 2:
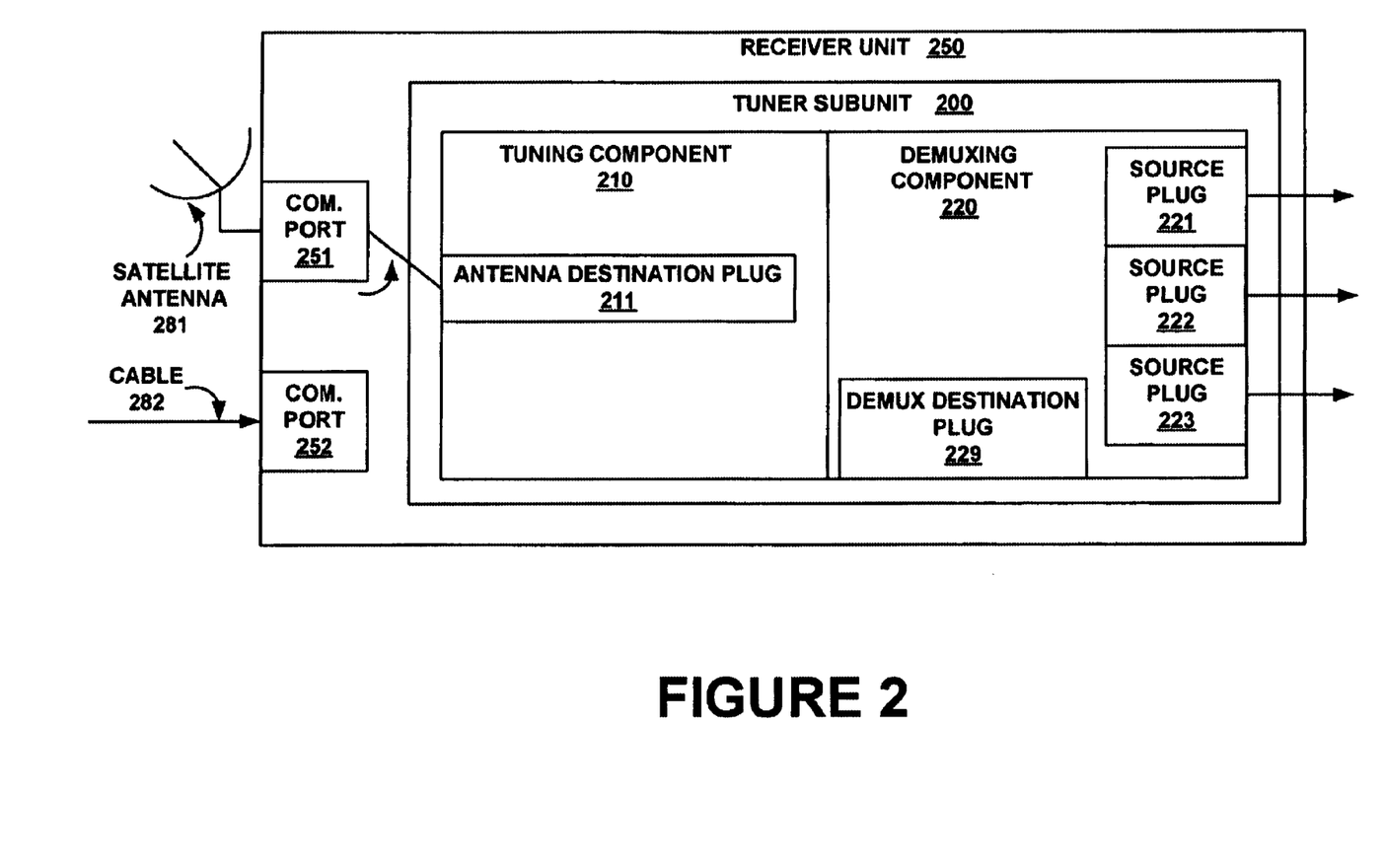
FIG. 2 is a block diagram illustration of a receiver system included in one embodiment of the present invention.

FIG. 2 is a block diagram illustration of receiver system 250, included in one embodiment of the present invention. Receiver system 250 comprises input communications port 251, communications port 252 and tuner subunit 200. Input communications ports 251 and 252 are communications ports for communicating information to tuner subunit 200 from outside sources. In one exemplary implementation of the present invention input communications port 251 is coupled to satellite antenna 281 and input communications port 252 is coupled to cable 282 which provides DVB and analog video signals. Tuner subunit 200 is for tuning into a particular service from a video broadcast of information and comprises tuning component 210 and demuxing component 220. Tuner subunit 200 is one embodiment of tuner 110 and is controlled by a tuner controller (e.g., tuner controller 120) based upon instructions (e.g., geographical default natural language indicator 131) stored in a memory (e.g., memory 130). One exemplary video broadcasting service delivery model that broadcasts a signal to a present invention natural language table selection default turner is configured in accordance with European Telecommunications Standard prETS 300 468.

In one embodiment of the present invention, tuning component 210 includes antenna destination plug 211. Demuxing component 220 includes source plugs 221 through 223 and demux destination plug 229. Antenna destination plug 211 is a communications port for communicating information from either input communications port 251 or 252. Demuxing component 220 is for demultiplexing information and forwarding it downstream from natural language table selection default receiver system 250 via plugs 221 through 223. There are four types of information that are demultiplexed by receiver system 250, including multiplex information from a single source (e.g., transponder), service information (e.g., a transmission signal under the control of a single broadcaster such as CNN, BBC, NBC, etc.), component information including video and audio (e.g., English natural language information or Spanish natural language information) and data information including subtitling. Demux destination plug 229 is a communications port (e.g., IEEE 1394 compliant) for communicating information (e.g., serial information) to demux component 220. In one implementation of the present invention, demux destination plug 229 is compliant with IEEE 1394 standards.

Figure 3A:
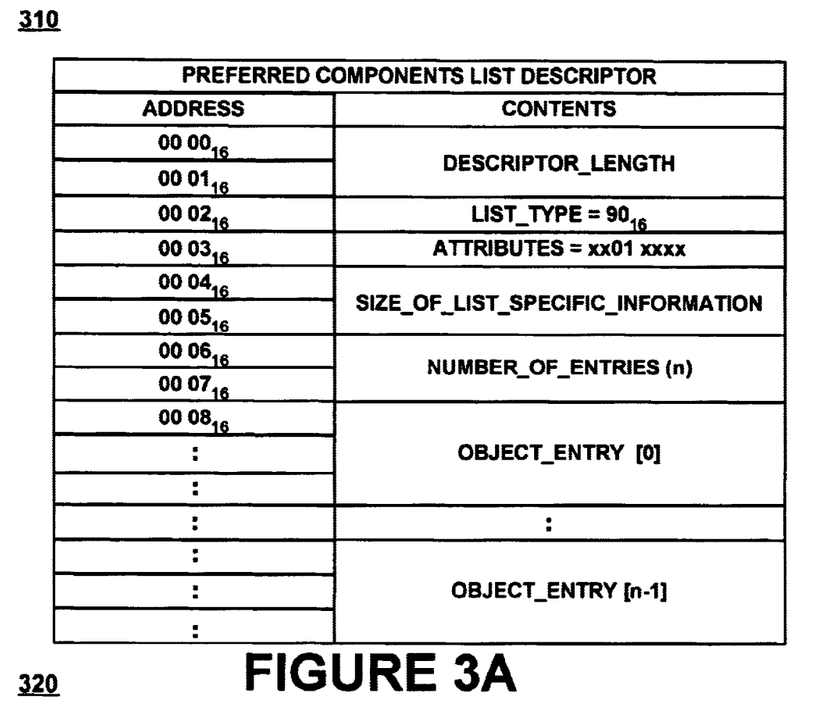
FIG. 3A is a table showing one configuration of a preferred components list descriptor utilized in one embodiment of the present invention.

In one embodiment of the present invention, the geographical natural language table (e.g., geographical natural language table 132) is configured in compliance with IEEE 1394 Audio Visual Command (AV/C) Set version 1.0 requirements and is included in an IEEE 1394 compliant AV/C tuner preferred components list descriptor. FIG. 3A is a table showing one configuration of a preferred components list descriptor 310 utilized in one embodiment of the present invention. The preferred component list 310 specifies several preferred components objects including geographical natural language tables. Each preferred components object comprising a geographical natural language table provide a definition of audio and subtitling component selections that are utilized when a service is selected (for example when an OBJECT NUMBER SELECT or DIRECT SELECT INFORMATION TYPE command is executed). In one exemplary implementation of the present invention, a reference to a preferred component object including a geographical natural language table is also included in a preset object entry.

Preferred components list descriptor 310 comprises a variety of objects that describe the list configuration. The descriptor_length field comprises the number of bytes included in preferred components list descriptor 310 minus the number of bytes in descriptor_length field. In one embodiment of the present invention, the attributes defined at address offset 00 03 include a bit which indicates has_child_id is for object entries and is set to zero. In one exemplary implementation, the attributes defined at address 00 03 comprise one byte of information of which the most significant bit is a logical 0 and all undefined attributes bits are treated as reserved. In one embodiment of the present invention there is no list_specific_information for the Preferred Components List and the size_of_list_specific information field at address offset 00 04 is 00.

Figure 3B:
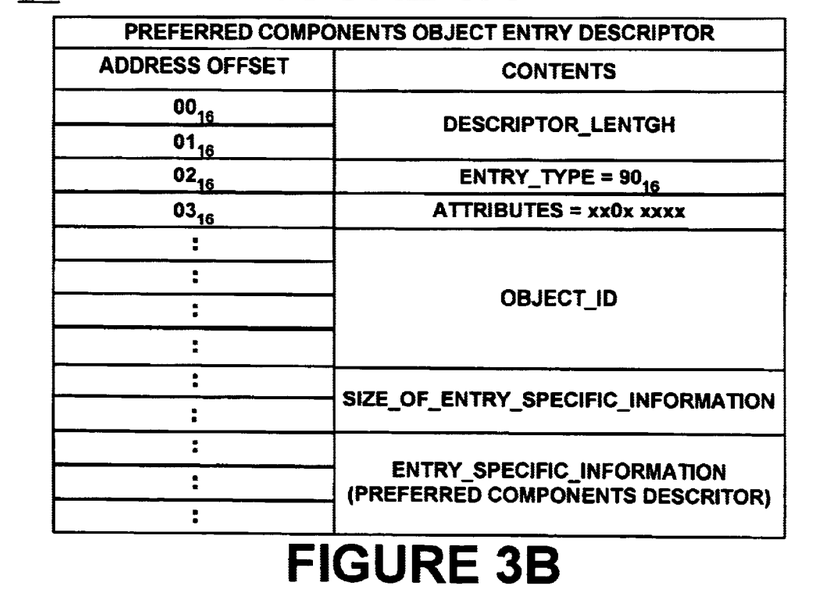
FIG. 3B is an illustration of a Preferred Components Object Entry Descriptor Table that defines the configuration of each object_entry definition from a preferred components list descriptor.

In one exemplary implementation of preferred components list descriptor 310, the objects (e.g., a geographical natural language table) have object identifiers (IDs). In one exemplary implementation the object identifiers include France for geographical natural language table 132, Japan for geographical natural language table 133, and United States for geographical natural language table 134. FIG. 3B is an illustration of a Preferred Components Object Entry Descriptor Table 320 that defines the configuration of each object_entry definition of preferred components list descriptor 310.

Preferred Components Object Entry Descriptor Table 320 defines the format of preferred components object entries starting at address offset 08. The descriptor_length field identifies the number of bytes which follow in Preferred Components Object Entry Descriptor Table 320 minus the number of bytes in the descriptor_length field itself. The attributes definition starting at address 03 of Preferred Components Object Entry Descriptor Table 320 specify that it has no child_list_ID and all undefined attribute bits are treated as reserved. The size_of_entry_specific_information field specifies the number of bytes included in the entry_specific_information field. In one exemplary implementation, the size_of_entry_specific_information field comprises two bytes and is not included in the calculation of bytes included in the entry_specific_information field.

Figure 3C:
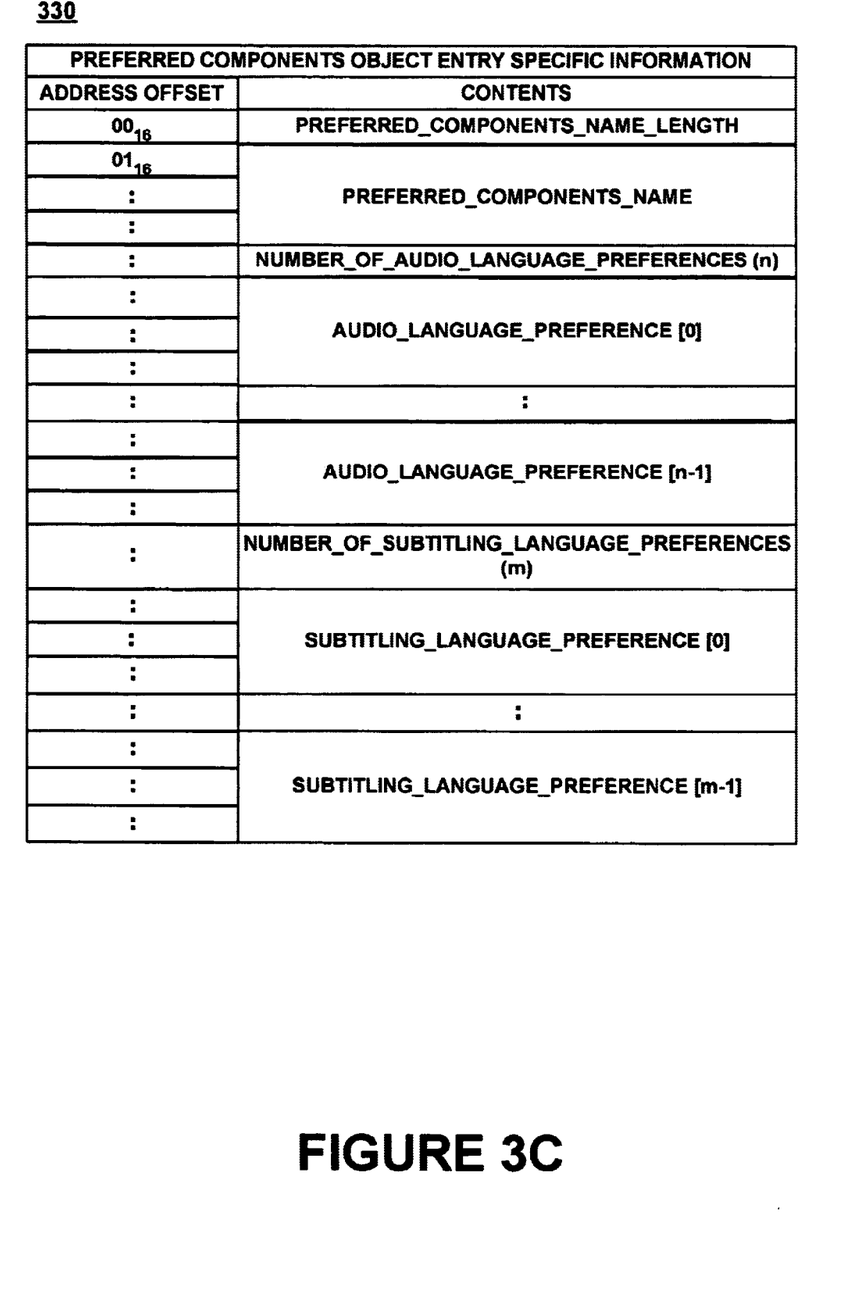
FIG. 3C is an illustration of a entry_specific_ information field 330 configuration utilized to describe a geographical natural language table in one embodiment of the present invention.

A geographical natural language table is included in a entry_specific_information field and provides a descriptor of a natural language preference. FIG. 3C is an illustration of a entry_specific_information field 330 configuration utilized to describe a geographical natural language table in one embodiment of the present invention. The preferred_components_name_length field specifies the number of bytes in the following preferred_components_name field. The preferred_components_name field specifies the name of a particular object (e.g., a France geographical natural language table 132). In one embodiment of the present invention, a value of zero in the preferred components_name field indicates there is no name. The number_of_audio_language_preferences field and the number_of_subtitling_language_preferences indicate how many audio language preferences and subtitling language preferences respectively are included in the object (e.g., a geographical natural language table). The audio_language_preference fields and the subtitling_language_preference fields hold audio language preference specifiers (e.g., French, English German) and for a natural language selection.

In one embodiment of the present invention, the value stored in a geographical default natural language indicator is an object identifier (e.g., France, Japan, United States, etc.). A tuner controller (e.g., tuner controller 120) utilizes the value stored in the geographical default natural language indicator to automatically retrieve natural language table associated with the object identifier (e.g., France, Japan, United States) included in preferred components list descriptor 310. Thus, natural language preferences configured in accordance with IEEE 1394 Audio Visual Command (AV/C) Set version 1.0 requirements function as default geographic natural language preferences.

In one embodiment of the present invention, the audio language preference specifiers and subtitling preference specifiers are arranged in priority order, with the first entry having the highest priority. If a service broadcast provides an audio language component in a natural language identified in the first entry of the audio language (e.g., audio language item [0]) in the geographical natural language table entry_specific_information field, then that audio component is forwarded by the tuner. If the audio component specified in the first entry (e.g., audio language item [0]) is not provided in a service broadcast, then the tuner shall determine if an audio component compatible with the natural language identified in the second entry (e.g., audio language item [1]) of the geographical natural language table entry_specific_information field is provided. The subtitling_language_preference fields are prioritized in a similar manner. In one exemplary implementation of a present invention AV/C tuner model, audio and subtitling component references are specified the same way for all broadcast systems, using the ISO_639_language_code definitions referred to by the Digital Video Broadcast system.

Figure 4:
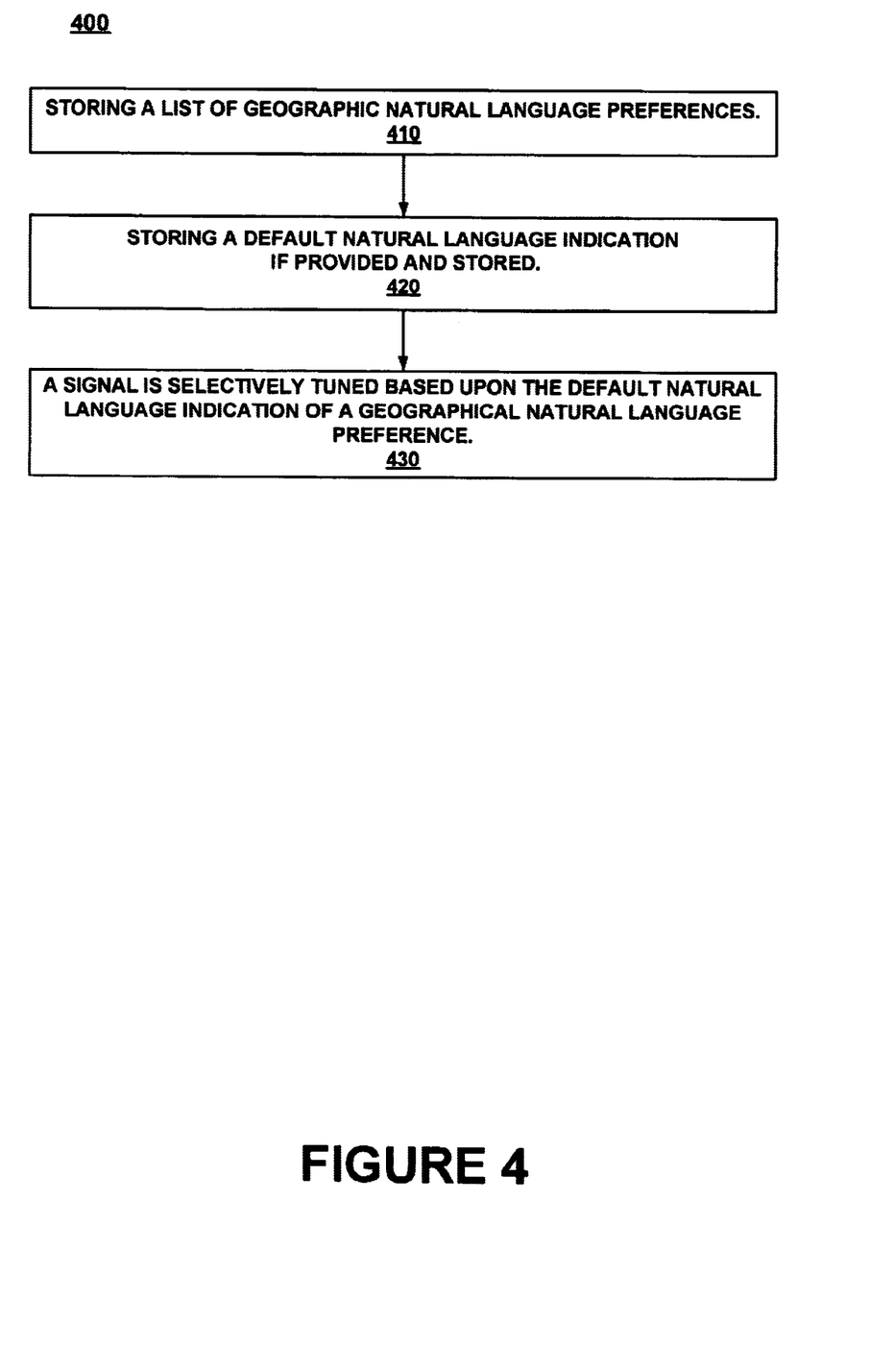
FIG. 4 is a block diagram of natural language default selection method, one embodiment of the present invention.

FIG. 4 is a block diagram of natural language default selection method 400, one embodiment of the present invention. Natural language default selection method 400 facilitates default presentation of information in a geographically preferred natural language and assists efficient production of video presentation devices configured for presentation in natural languages preferred in a desired geographical area. Natural language default selection method 400 also assists efficient reconfiguration of geographic natural language preferences in response to geographic marketing and utilization changes.

In step 410 a list of geographic natural language preferences are stored. In one embodiment of the present invention the list of geographic natural language preferences is stored in a memory (e.g., memory 131) and comprises a plurality of natural language selections including a first natural language selection(e.g., French) a second natural language selection (e.g., English) and a third natural language selection (e.g., German). In one exemplary implementation the list of geographic natural language preferences are arranged in geographical natural language tables (e.g., geographical natural language table 132) configured in compliance with IEEE 1394 Audio Visual Command (AV/C) Set version 1.0 requirements and included in an IEEE 1394 compliant AV/C tuner preferred components list descriptor.

In step 420 a default natural language indication of said geographical natural language preference list is provided and stored in a memory. In one embodiment of the present invention, the default natural language indication includes a default natural language indicator (e.g., default natural language indicator 131) established during manufacturing of a video presentation device. In one exemplary implementation the default natural language indication acts as a pointer to a list of geographic natural language preferences. In one exemplary implementation the default natural language indication is an object identifier (e.g., France, Japan, United States, etc.) included in a an IEEE 1394 compliant AV/C tuner preferred components list descriptor.

In step 430 information in a signal is selectively tuned based upon the default natural language indication of a geographical natural language preference. In one exemplary implementation of the present invention, information associated with a presentation in a particular natural language preference is forwarded to downstream components and information not associated with a presentation in the particular natural language preference is filtered out and not forwarded to downstream components.

What is claimed is:

1. A video tuner natural language default selection system comprising:
    a tuning means for receiving communication signals and tuning into particular geographical default natural language information included in said communication signals;
    a tuner controlling means for providing instructions to said tuning means on the selection of said geographical default natural language information for communication to downstream components, said tuner controlling means is coupled to said tuning means; and a memory means for storing information for said tuner controlling means, said memory means is coupled to said tuner controlling means, wherein said memory means includes a geographical default natural language indicator for referring to a geographical natural language table comprising natural language selections associated with said geographical default natural language information wherein said geographical natural language table is automatically stored in said memory means during the manufacturing process.

2. The video tuner natural language default selection system of claim 1 wherein said communication signals comprise a television broadcast signal.

3. The video tuner natural language default selection system of claim 1 wherein said memory means stores a geographical natural language table comprising natural language selections.

4. The video tuner natural language default selection system of claim 1 wherein said memory means stores a geographical natural language table comprising a listing of natural language preferences for a particular geographical area.

5. The video tuner natural language default selection system of claim 1 wherein said memory means stores geographical natural language table includes a first natural language selection, a second natural language selection and a third natural language selection.

6. A video tuner natural language default selection system comprising:

a tuner for tuning into particular information included in a television broadcast signal;

a tuner controller for providing instructions to said tuner on the selection of information for communication to downstream components, said tuner controller is coupled to said tuner; and a memory for storing information for said tuner controller, said memory is coupled to said tuner controller, wherein said memory includes a geographical default natural language indicator for referring to one of a plurality of geographical natural language tables comprising natural language selections.

7. A video tuner natural language default selection system of claim 6 wherein said plurality of geographical natural language tables are configured to comply with IEEE 1394 requirements and is included in an IEEE 1394 compliant AV/C tuner preferred components list descriptor.

8. A video tuner natural language default selection system of claim 7 wherein said preferred component list specifies several preferred components objects including said plurality of geographical natural language tables.

9. A video tuner natural language default selection system of claim 8 wherein said preferred components objects including the geographical natural language tables provide a definition of audio and subtitling component references that are utilized when a service is selected.

10. A video tuner natural language default selection system of claim 7 wherein a reference to a preferred component object including a geographical natural language table is also included in a preset object entry.

11. A video tuner natural language default selection system of claim 7 wherein said preferred components list descriptor comprises a variety of objects that describe the list configuration.

12. A video tuner natural language default selection system of claim 7 wherein said preferred components list descriptor comprises a geographical natural language table objects are configured in accordance with an IEEE 1394 compliant preferred components object entry descriptor table.

13. A video tuner natural language default selection system of claim 7 wherein a geographical natural language table is included in a entry_specific_information field of a preferred components object.

14. A video tuner natural language default selection method, comprising the steps of:

storing a list of geographical natural language preferences;

providing a default natural language indication of said geographical natural language preference, wherein said list of geographic natural language preferences is arranged in geographical natural language tables configured in compliance with IEEE 1394 Audio Visual Command (AV/C) Set version 1.0 requirements and included in an IEEE 1394 compliant AV/C tuner preferred components list descriptor; and selectively tuning information in a signal based upon said default natural language indication of said geographical natural language preference.

15. The video tuner natural language default selection method of claim 14 wherein said list of geographic natural language preferences is stored in a memory and comprises a plurality of natural language selections.

16. The video tuner natural language default selection method of claim 14 wherein said default natural language indication includes a default natural language indicator established during manufacturing of a video presentation device.

17. The video tuner natural language default selection method of claim 14 wherein said default natural language indication acts as a pointer to a list of geographic natural language preferences.

18. The video tuner natural language default selection method of claim 14 wherein said default natural language indication is an object identifier included in a an IEEE 1394 compliant AV/C tuner preferred components list descriptor.

* * * * *